H. A. ALLEN.
WATER PURIFYING APPARATUS.
APPLICATION FILED JUNE 8, 1916.

1,236,645.

Patented Aug. 14, 1917.
7 SHEETS—SHEET 1.

H. A. ALLEN.
WATER PURIFYING APPARATUS.
APPLICATION FILED JUNE 8, 1916.

1,236,645.

Patented Aug. 14, 1917.
7 SHEETS—SHEET 4.

Inventor:
Henry A. Allen,
By David H. Fletcher,
Atty.

UNITED STATES PATENT OFFICE.

HENRY A. ALLEN, OF CHICAGO, ILLINOIS.

WATER-PURIFYING APPARATUS.

1,236,645.  Specification of Letters Patent.  Patented Aug. 14, 1917.

Application filed June 8, 1916. Serial No. 102,453.

*To all whom it may concern:*

Be it known that I, HENRY A. ALLEN, a citizen of the United States, residing at Chicago, in the county of Cook and State of Illinois, have invented certain new and useful Improvements in Water-Purifying Apparatus, of which the following is a description, reference being had to the accompanying drawings, forming a part of this specification, in which corresponding numerals of reference in the different figures indicate like parts.

My invention relates to water supply systems generally, but more especially to those adapted for municipal and analogous purposes, in which large quantities of water are required to be treated and purified by aeration or aeration and separation.

The object of my invention is to provide a simple and effective means for eliminating the various impurities held in suspension in "raw" water and aerating the same to render it pure, sparkling and clear.

To these ends, my invention consists in the combination of elements hereinafter more particularly described and definitely pointed out in the claims.

Figures 1, 2, 3:
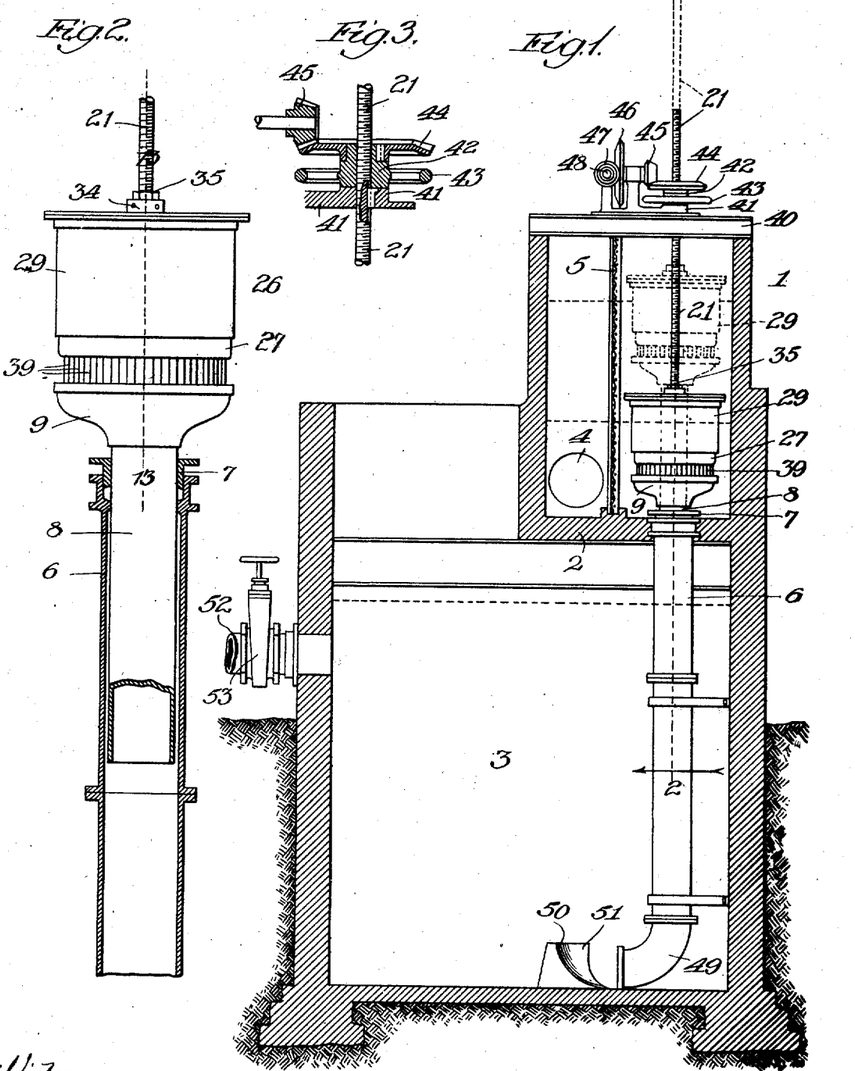
Figure 1, is a transverse vertical sectional view of a concrete tank showing my improved aerator in elevation therein.
Fig. 2, is a section taken upon the line 2—, Fig. 1, viewed in the direction of the arrow there shown.
Fig. 3, is a central vertical section in detail of the gearing mechanism.
Figure 5:
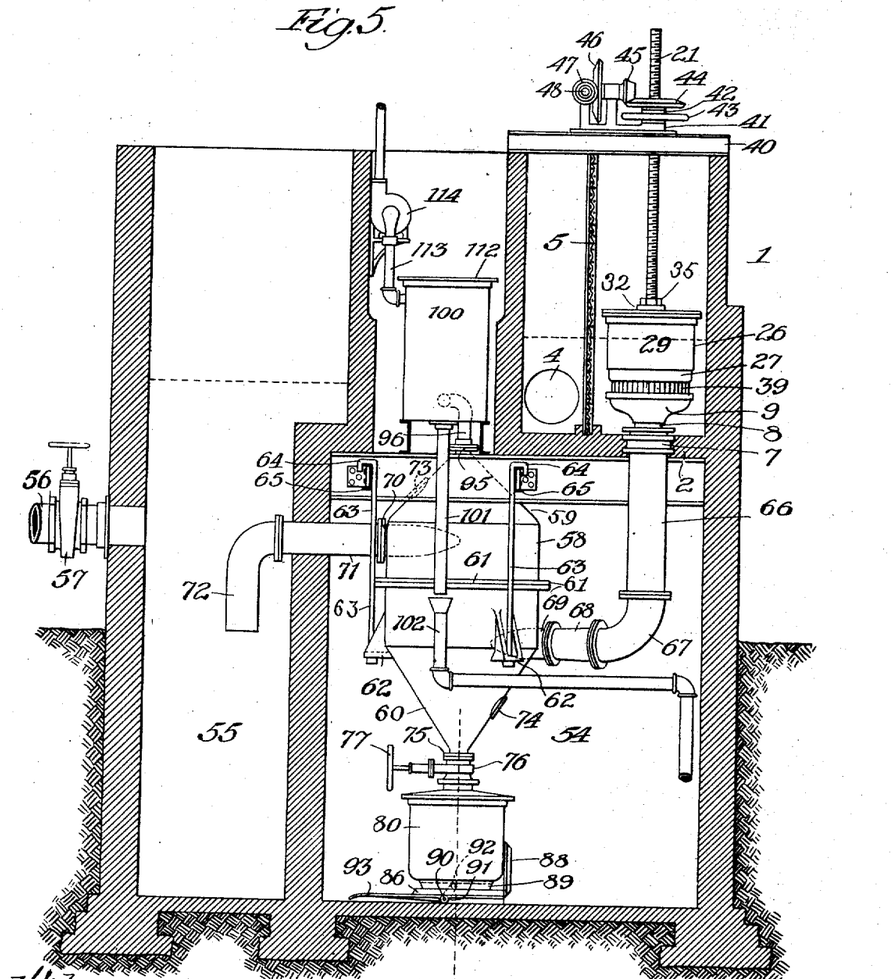
Fig. 5, is a view similar to Fig. 1, showing a vortex-whirl located in the tank.
Figure 6:
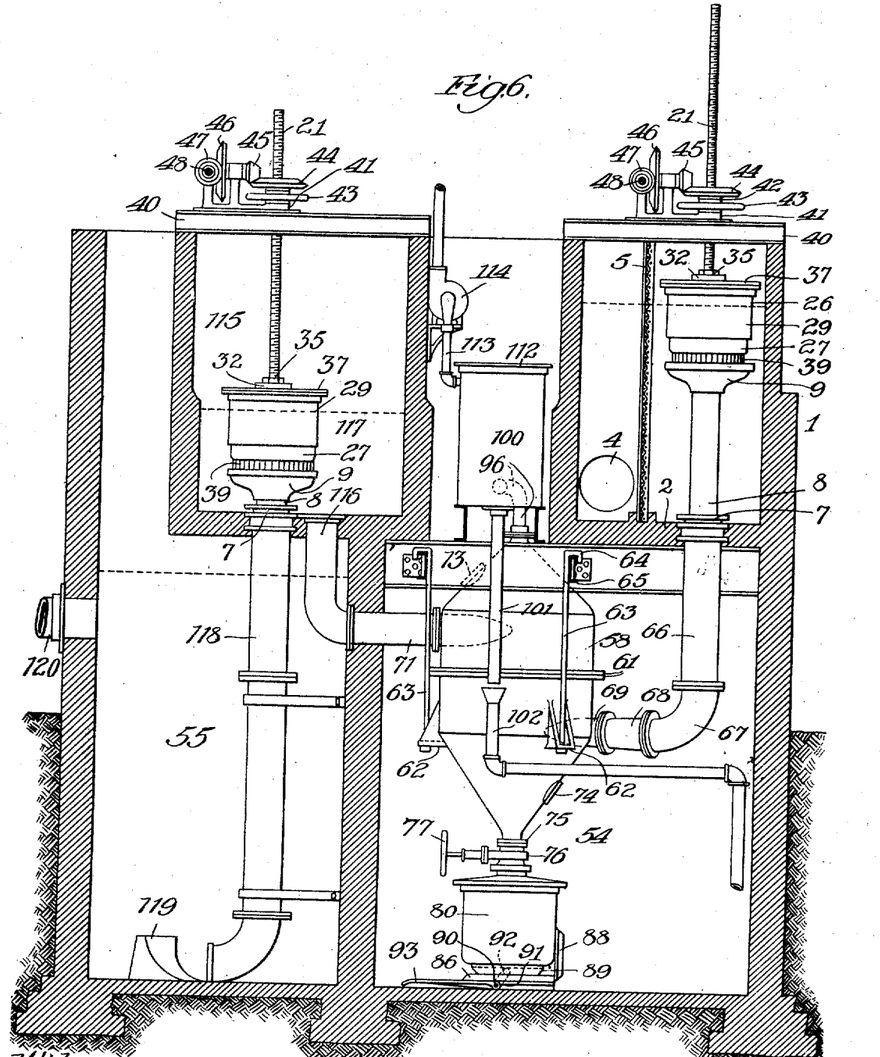
Fig. 6, is a view corresponding to that shown in Fig. 1 with a second aerator adapted to receive the discharge from the vortex-whirl connected with the primary aerator.

Referring to the drawings, 1, Figs. 1, 5 and 6 indicates a receiving-tank having a raised floor 2, with a space beneath to serve as a secondary or sedimentation tank 3, as shown in Fig. 1 or for other purposes presently to be stated, as shown in said other views. Said tanks are preferably formed from concrete. An inlet pipe 4, is connected with the receiving tank which is divided into two compartments by means of a suitable screen 5, for preventing coarse materials in the raw water from entering the purifying apparatus.

Figure 13:
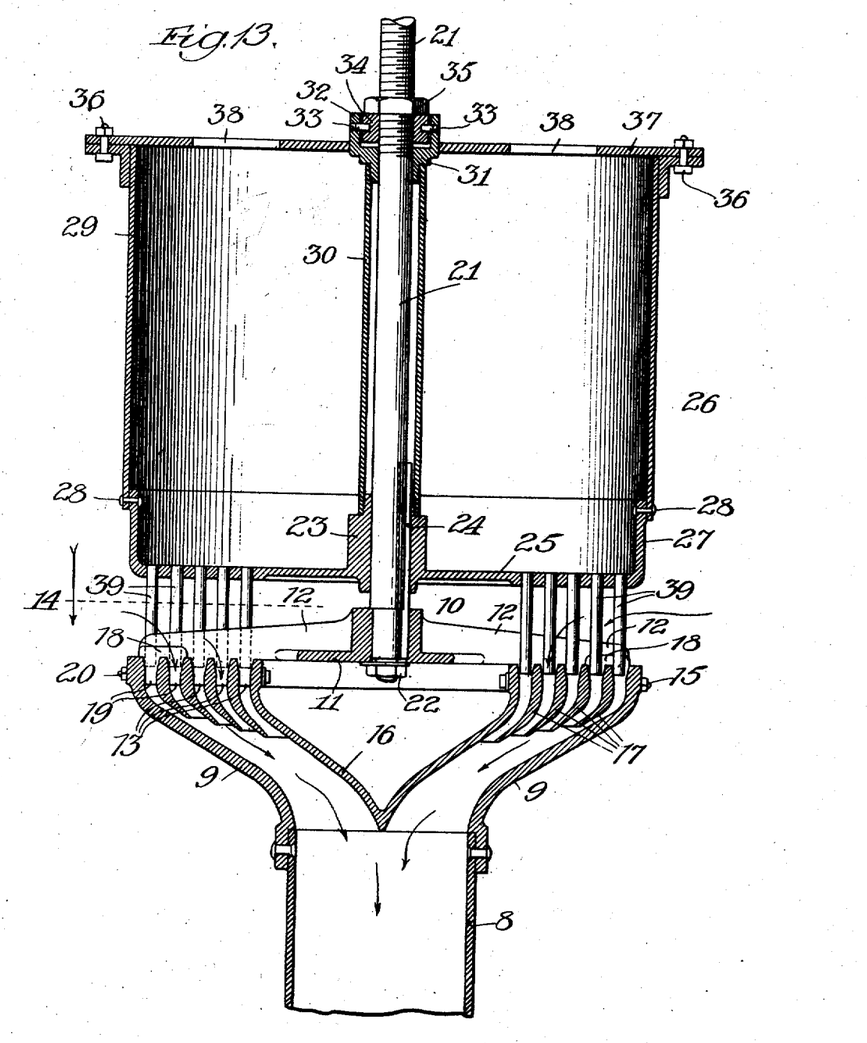
Fig. 13, is a section taken upon the line 13—13, Fig. 2 and, Fig. 14, is a sectional view in plan taken upon the line 14—, Fig. 13.
Figure 14:
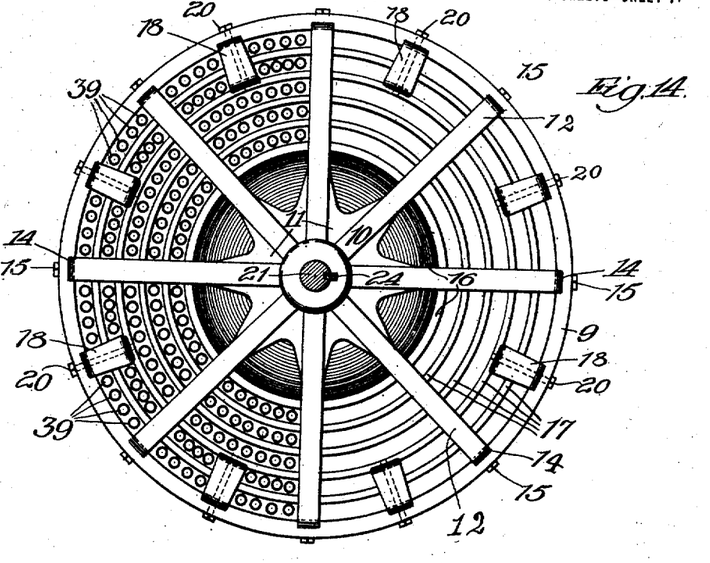

A vertically arranged pipe 6, Figs. 1 and 2 has its upper end concreted in the floor 2, or bottom of the receiving tank. Said pipe is provided with a stuffing-box 7, to form a tight joint between it and a bronze tube 8. Figs. 2 and 13, which is extended therein from above and adapted to telescope therewith. The top of the tube 8 is connected with the lower part of a funnel-shaped bowl 9, also shown in Fig. 14, to the top or rim of which is attached a spider, generally designated by 10, which consists of a central web 11, having arms 12, extended radially therefrom each of which is provided with a series of depending lugs 13, shown at the left in Fig. 13, those upon the outer ends of said arms being fitted in recesses 14, Fig. 14, formed in the inner rim of the bowl, through which rim and lugs are passed securing pins or bolts 15. Located in the middle of the bowl and concentric therewith, is a depending conoidal shaped shell 16, between, which and the periphery of the bowl is located a series of annular rings 17, which are spaced apart by means of the lugs 13. Said conoidal shell and rings are all rigidly held in place by means of the bolts 15. The rings have their lower edges made thin and flared inward as shown, to conform to the outer contour of the central shell, 16, the lower edges of said rings being by preference, extended to lower levels in the order of their inward succession, cross-sectional areas being proportioned to insure proper fluid velocities. Located in the spaces between the ends of the arms 12, are blocks or stubs 18, having depending spacing lugs 19, Fig. 13, one of which is interposed between the bowl and the outer ring and the other between said ring and the one inclosed thereby. Said blocks are secured in place by means of bolts 20 which are passed through said lugs, the rim of the bowl and two outer rings. The upper edge of the rings 17, are slightly tapered as shown in Fig. 13, and said rings, as joined together, constitute a kind of grid which I term an orifice-plate, the purpose of which will be presently explained.

Projected through a central bore in the spider 10, is an upwardly extended shaft 21, which is secured at the lower end by means of a nut 22. A hub 23, Fig. 13, is slidably fitted upon the shaft, the two having counterpart grooves for the reception of a spline 24, to prevent rotation of the hub. Integral with said hub is a horizontal circular member 25 which forms a flat bottom for a cylindrical air-box generally designated by 26; the hub, bottom, and a portion 27, forming the lower part of the side wall, is formed in one piece, preferably of cast-iron, to which is riveted at 28, a sheet-metal cylindrical portion 29.

Tapped upon the upper part of the hub 23, is a tube 30 which incloses the shaft 21, said tube having a hub 31, tapped into its upper end. Said hub has formed thereon an upwardly extended annular flange 32, through which screws 33 are passed as shown, into a nut 34 upon the shaft 21, which shaft is screw threaded from the part 31, to its upper end. The nut 34, is for the purpose of adjusting the relative height of the air-box and air tubes thereof with respect to the orifice-plate as hereinafter described. A lock-nut 35, upon the shaft 21, serves to secure the nut 34 in place when adjusted.

Preferably fitted to the hub 31 and secured to the rim of the air box by means of bolts 36, is a top plate 37, which, assuming the air-box to be utilized for aeration alone, may be omitted; but in such case it should be provided with openings 38 to freely admit air to the chamber. Its use serves to render the structure more stable, which is desirable when accuracy of adjustment is considered.

Fitted in bores symmetrically arranged in the bottom of the air-box, are a large number of closely juxtaposed air-tubes 39, preferably of equal length, which tubes are extended downwardly between the arms of the spider into the annular spaces between the rings 17.

Figure 4:
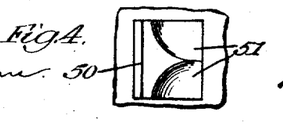
Fig. 4, is a plan view of the deflecting abutment in the bottom of the tank.

Beams 40, Fig. 1, are supported upon the walls of the receiving tank upon which, in turn, is placed a bearing-plate or base 41, also shown in Fig. 3, which serves as a support for an adjusting-nut 42, mounted upon the threaded shaft 21. The air-box and bowl 9 are suspended upon the shaft 21, and the purpose of the adjusting nut is to enable the air-box and bowl with their several parts, to be raised and lowered to conform to the varying water level of the receiving tank; the telescoping tube 8, being provided to permit such vertical adjustment. The adjusting nut 42, may be operated either manually or by power. For the former purpose a hand-wheel 43, may be provided; for the latter, a beveled gear 44 splined upon the nut 42, as shown in Fig. 3, may be connected through gears 45, 46, and 47, to a shaft 48, leading to a source of power. In Fig. 1 the air-box and other parts are shown in full lines as they would appear when in the lowermost position with a water-level indicated in dotted lines, while the dotted position of the parts indicates a position adapted to conform to the higher water level represented by the dotted lines. In the figure referred to, the pipe 6 is extended downwardly to the bottom of tank 3 and connected with an elbow 49, arranged to direct the flow against an abutment 50, also shown in Fig. 4, of cement or other suitable material having curved diverging walls 51, adapted to deflect the flow of water. An effluent pipe 52 is connected with the tank 3 and provided with a shut-off valve 53.

The operation of the device thus far described is as follows: Assuming the water level in the receiving tank to be as indicated in Fig. 1, the height of the air box is adjusted so that the top of the bowl 9 will be well below the water level. This will permit the water to flow into the spaces between the tubes 39 and thence downwardly through the openings between the annular rings 17. The lower ends of the tubes 39 being extended into said spaces, the downward flow and swirl of the water around them tends to produce a suction through said tubes to draw in air which is mingled with the water and carried downwardly through the service pipe 6 and discharged at the bottom into the tank 3. The valve in the effluent pipe 52 should be so adjusted as to maintain the level in the tank below that in the receiving tank. It is obvious that the speed of the flow must depend upon the head, and that the amount of air entrained through the air tubes would depend to a considerable degree upon the relative head and to some extent upon the adjustment of the air-tubes which may be extended more or less into the openings between the rings by manipulating the adjusting nut. The device acts as an aspirator, and the entrained air is thoroughly distributed through the water and rises therein in innumerable small bubbles when discharged into the tank 3, tending to cause thorough aeration.

The device described is intended for water which is practically free from large particles of foreign matter. Should it contain more or less bulky sediment, I prefer to employ means in conjunction with the aerator for separating and removing the objectionable matter. I also prefer to provide automatic means for preventing a waste of water in the overflow used to drain off the lighter particles of sedimentary matter, as shown in the drawings and hereinafter more particularly described.

Figure 8:
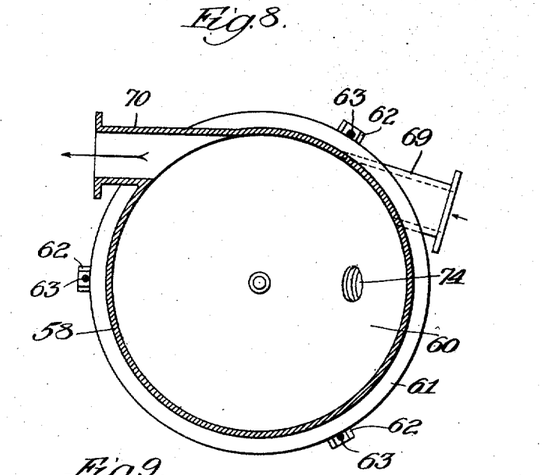
Fig. 8, is a sectional view in plan taken upon the line 8— Fig. 7.
Figure 9:
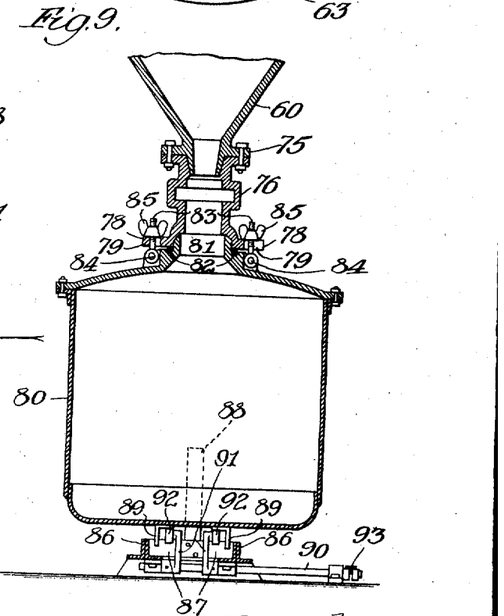
Fig. 9, is a central vertical section of the lower portion of the vortex-whirl and the heavy sludge reservoir connected therewith.

In Fig. 5, I have shown a modified construction for the treatment of raw water containing sediment; the purpose of the construction being to supplement the action of the aerator by means of a separating device adapted to remove sedimentary matter, and, in conjunction therewith, to eliminate offensive odors as well. In said view the aerating device, constructed as in Fig. 1, is shown in a receiving tank. The space, or chamber 54, otherwise occupied by said tank, is utilized for separating appliances, while the secondary tank 55, is located adjacently thereto, the same being provided with an effluent pipe, 56, having a shut-off valve 57. Located in the chamber 54, is a closed receptacle generally designated by 58, preferably formed from cast metal, which I have termed a "vortex-whirl." The body or middle portion of said receptacle is cylindrical, while the upper and lower portions, designated by 59 and 60 respectively, are tapered or conoidal in form. See also Figs. 7 to 10 inclusive. The receptacle is formed in two parts connected at the middle by means of flanges 61, bolted together. Lugs 62, are formed upon the lower portion of the body of the receptacle, to which are attached in any well known way suspending rods 63, the upper ends of which are provided with hooks 64, for connecting them with I-beams 65. A pipe 66, which is the equivalent of the pipe 6, Fig. 1, is arranged in like manner to receive the telescoping tube 8, attached to the bowl 9. Said pipe is shorter than the pipe 6 and is connected by means of an elbow 67 and short pipe 68, having the usual flanged connections, with a stub 69, formed upon and in tangential relation to the lower portion of the body of the receptacle 58, and forming an inlet thereto in the manner best shown in Figs. 7 and 8. A similar outlet stub 70, is formed upon the upper part of the body of said receptacle and arranged tangentially thereto and connected in turn with an effluent pipe 71, having a downwardly directed elbow 72 arranged to discharge into a sedimentation tank 55. Man-holes located in the upper and lower cones respectively and closed by means of removable caps 73 and 74, are provided to give access to the receptacle. Formed upon the lower end of the receptacle around a restricted opening, are flanges 75 to which is bolted in the manner best shown in Fig. 9, a shut-off valve 76, having a hand-wheel 77, Fig. 5. The lower portion of the valve casing is provided with a peripheral flange 78, having radial notches, 79, therein. A sludge reservoir 80, comprising a sheet-metal receptacle, is provided with an upwardly extended neck-portion 81, adapted to fit within the lower part of the valve casing and is sealed by means of a gasket 82. Bolts 83, are hinged at 84 to suitable lugs upon the reservoir top, which bolts are adapted to enter the notches 79, and are secured in place by means of thumb-nuts 85. Attached to the floor of the room 54, directly beneath the vortex-whirl, is a base supporting device for the sludge reservoir, consisting of parallel angle-iron members 86, Figs. 6 and 9, connected at the rear to a like member 87, to which is riveted a vertically arranged stop 88. Angle-iron cleats 89, are riveted to the bottom of the reservoir 80 and so spaced in parallel relation to each other as to pass between the members 86. A shaft 90 is supported in bearings and arranged transversely of the base supporting device, said shaft having short inclined arms 91, rigidly attached thereto with friction-rollers 92, journaled upon their upper ends, adapted to bear upwardly against the members 89. The shaft constitutes a fulcrum to which is rigidly attached a long foot-lever arm 93. When the reservoir is placed over the base supporting part and pushed against the stop 88, the neck 81 will be in position to register with the opening in the casing of the valve 76. A depression of the foot lever will serve to lift the reservoir in place, where it may be secured to the valve casing by means of the bolts 83 and thumb-nuts 85.

Figure 7:
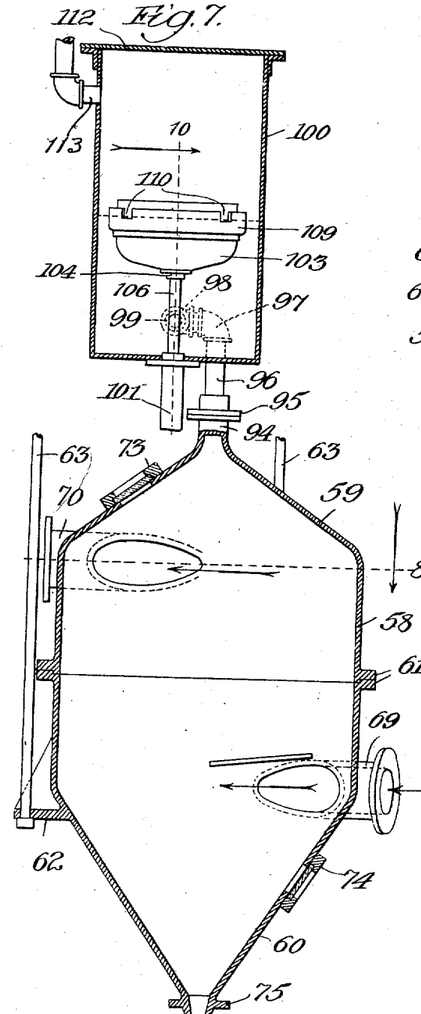
Fig. 7, is a vertical section of the vortex-whirl and light sludge reservoir connected therewith.
Figures 10, 11:
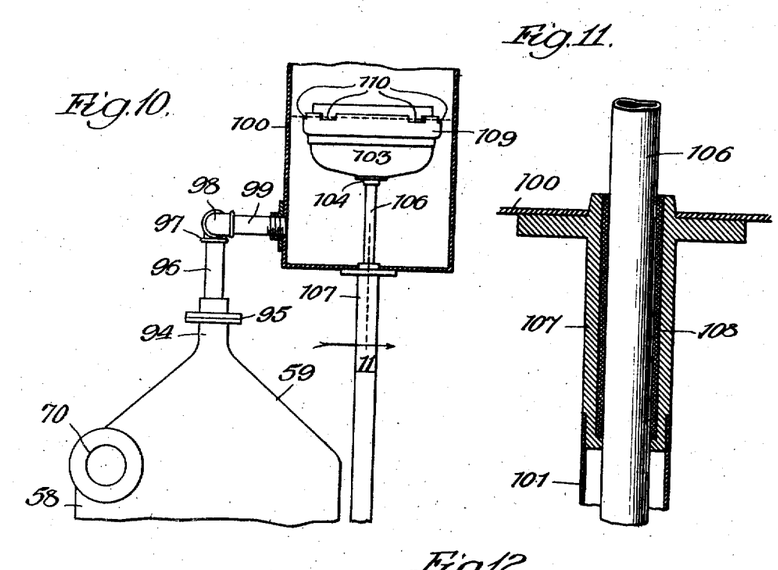
Fig. 10, is a section taken upon the line 10—, Fig. 7, viewed in the direction of the arrow there shown.
Fig. 11, is a section taken upon the line 11—, Fig. 10, viewed as indicated by the arrow.
Figure 12:
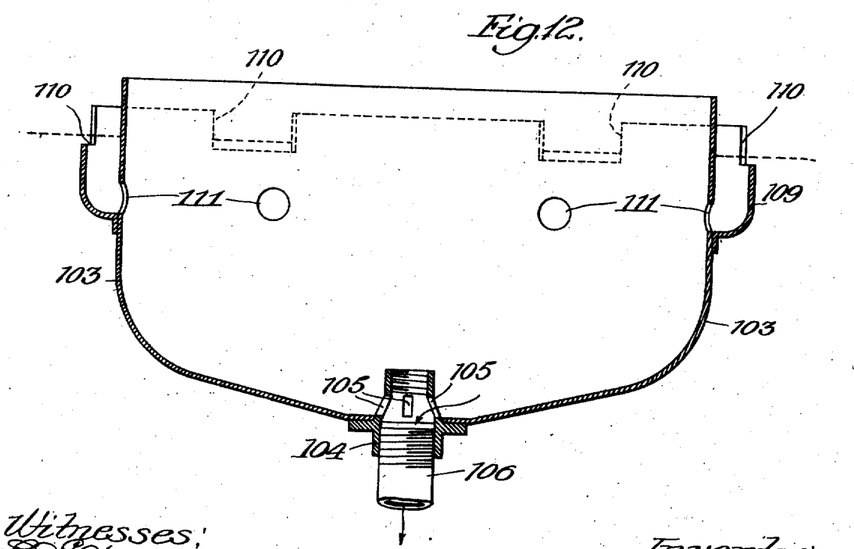
Fig. 12, is a central vertical section of the floating weir.

The upper part 59 of the vortex-whirl is provided with a neck portion 94, to which is attached by means of a flanged connection 95, Figs. 5, 7 and 10, a vertical pipe 96, connecting through elbow connections 97, 98 and a pipe 99, with the lower portion of an upper sludge reservoir 100, having a drain-pipe 101, arranged to discharge into an open ended pipe 102, Fig. 5, leading to a sewer. A floating-weir consisting generally of a bowl, 103, Figs. 7, 10 and 12, is located within the reservoir 100. Said bowl is open at the top and is preferably formed from sheet-metal. A tubular flanged fitting 104, is secured within a central opening in the bottom of the bowl and arranged to extend upwardly within and downwardly from beneath the same, said fitting being provided with outlet openings 105, Fig. 12. A discharge pipe or tube, 106, is tapped into the fitting 104, and arranged to telescope with the upper portion 107 of the pipe 101. Said part 107, which is attached by means of a suitable flange to the bottom of the reservoir 100, is of sufficient interior diameter to provide for a packing 108 therein, as shown in Fig. 11, to form a tight joint around the tube 106, thereby permitting the tube to telescope therewith as the bowl 103 is raised or lowered, while preventing leakage. An outwardly and upwardly extended flange 109, is attached to the periphery of the bowl 103 about midway between the top and the bottom to form an annular trough around the same. Said flange is provided with a series of notches 110, extending downward to a uniform level from its upper edge to permit water to flow into the trough and a series of openings, 111, Fig. 12, on a level with the bottom of the trough, are formed in the body of the bowl to permit water to flow from the trough into the bowl. The buoyancy of the bowl should be such as to cause it to sink to such a depth as to permit water to enter the notches but not to overflow the upper edge of the trough, such water level being indicated in dotted lines in Figs. 7, 10 and 12.

The reservoir 100 is, by preference, provided with a cover, 112, to which is connected a pipe 113, leading to the open air or to a ventilating shaft, in which pipe I prefer to interpose an exhaust fan 114.

The operation of the vortex-whirl, the lower sludge reservoir, the reservoir 100 and the weir construction is as follows:

The normal "head" in the receiving tank should be such as to cause a rotative or whirling motion of the water as a result of its tangential introduction into the receptacle 58. The "vortex-whirl" thus produced within the receptacle tends to accelerate the movement of sedimentary particles, heavier than the liquid, downwardly, and the movement of suspended sedimentary particles lighter than the liquid, toward the central axis and upwardly. The separated heavier particles pass downwardly to the tapered portion of the receptacle and thence to the sludge reservoir 80, while at the same time the lighter separated particles pass upward through the part 96 into the reservoir 100 from whence they may be drawn or run off over the notches 110 of the floating weir and thence through the drain pipe to the sewer.

The overflow, or weir construction, is automatic in its action, in that it adapts itself to the relative level of the water within the tank 100: and, inasmuch as the overflow from the notches 110 would be substantially uniform and limited in quantity, it follows that the lighter particles of sediment would be carried off while a waste of water would be prevented. In other words, the floating weir, while maintaining a constant overflow, adapts itself to any variation in head at the source of supply.

In addition to the above described actions, the air introduced by means of the aerator will, upon its entrance to the lower portion of the receptacle 58, be under a pressure, the degree of which will be dependent upon the "head" or liquid level in the receiving tank. The air tends to rise rapidly, being influenced in direction by reason of the rotation or whirl of the liquid within the receptacle 58, thereby serving to cause a more thorough and intimate mixture with the liquid and to accentuate the vortex whirl action while increasing its efficiency.

The body of the liquid from which a portion or all of the suspended or sedimentary material has been separated and carried off as stated, is discharged through the outlet 71. It will thus be seen that by a strictly mechanical action the light and heavy particles are separated from the water and separately discharged according to their relative gravities.

In Fig. 6, I have shown a modified construction which corresponds in every respect to that shown in Fig. 5, up to the point of discharge from the vortex-whirl; and hence, in order to avoid confusion, I have indicated the aerator by a general number, while the parts of which it is composed are numbered to correspond with like parts shown in the other views. The purpose of the construction shown in Fig. 6 is to carry the process one step farther than it can be carried by that shown in Fig. 5, to cause further aeration of the water when desired.

Located above the tank 55, is a tank 115, intended to receive the water directly from the vortex-whirl 58, through a pipe 116, attached to the pipe 71, and cemented into the bottom of the tank 115. An aerator generally designated by 117 corresponding in its various details to the aerator located in the receiving channel, and therefore requiring no further description, is located in the tank 115, and provided with a discharge pipe 118 which is extended to the bottom of the tank 55, having a curved portion upon the lower end directed against an abutment 119, corresponding to the abutment 50 in Fig. 1. An effluent pipe 120, leads from the tank.

The purpose of the floating weir is to prevent waste of water and it should be so adjusted as to provide for a sufficient overflow to carry off the foreign particles which rise to the surface. This adjustment may be accomplished by means of small weights added to or removed from the bowl.

The aerator 117, shown in Fig. 6 is merely supplemental to the action described with reference to Fig. 5 and is only recommended in cases where the water may be improved by further aeration after having passed through the vortex-whirl.

The introduction of the water under pressure as contemplated in Fig. 16, only serves to intensify the action without varying the mechanical principles involved and therefore requires no further mention. This is likewise true of the introduction of gases or chemicals; the advantages concerning them being the thorough and complete mixture obtained by reason of merely passing them through the apparatus.

Should a second aeration be found desirable it should be borne in mind that the water in the receiving tank should be kept higher than that in the tank in which the second aerator is located.

I do not wish to be limited to the specific form of aerator shown nor to any particular construction of other features or limited application of the device, inasmuch as the construction and uses may be varied without departing from the spirit of the invention.

Having thus described my invention, I claim:

1. A water system of the class described, comprising, in combination, a receiving-tank for raw water, an aerator located therein comprising a water intake member having a plurality of channels for permitting a downward flow of water in separate streams to mingle in a common flow at a lower level, air conduits located above said stream separating means, said conduits being in communication with the atmosphere and with said water channels and a conduit for delivering said water into a predetermined receptacle.

2. A water system of the class described, comprising, in combination, a receiving tank, an aerator located therein having a water receiving member provided with orifices therein for permitting a downward flow of water, air conduits having their upper ends in communication with the atmosphere while their lower ends are in communication with said orifices, the area of the orifices being greater than that of the conduits to enable the water flow to cause a suction through the conduits and means for discharging said flow into a predetermined receiver.

3. A water system of the class described in which is combined a receiving tank, an aerator located therein having a water receiving member provided with water inlet orifices, air conduits in communication with said orifices and with the atmosphere, the parts in communication with said orifices being smaller than said orifices, whereby the water flow may cause air to be entrained therein, means for conducting said water and entrained air to a receptacle at a lower level and means for raising and lowering the receiving portion of said aerator.

4. A water system of the class described comprising a receiving channel, an aerator located therein having a funnel-shaped water receiving member, an orifice-plate located in said member having a multiplicity of orifices therein for the admission of water, a separate air conduit in operative communication with each of said orifices and with the atmosphere, means for raising and lowering said aerator from a level above the water-level of the receiving channel to any predetermined depth beneath it and means for conveying water from said water-receiving member to a receptacle at a lower level.

5. A water system of the class described, comprising a receiving channel, an aerator therein having a water receiving member, an orifice-plate located in said member having a series of orifices therein for the admission of water from the receiving channel, a separate air conduit in communication with each of said orifices and with the atmosphere, means for adjusting said air conduits with respect to said orifice-plate to vary the extent to which they may be projected into said orifices and means for conveying water from said water receiving member to a receptacle at a lower level.

6. A water system of the class described comprising a receiving channel, a water receiving member therein for receiving and conveying water to a receptacle at a lower level, an orifice-plate in said receiving member provided with a series of orifices for the passage of water, an air-box located above said water receiving member, said box being in communication with the atmosphere, a plurality of air-tubes extending downwardly from said box into communication with said orifices and means for adjusting said device to normally maintain said orifice-plate at a predetermined level below the water level in said water receiving chamber.

7. A water system of the class described, comprising a receiving-channel, a water receiving member therein for receiving and conveying water to a receptacle at a lower level, a plurality of concentric rings located at a common level in the upper part of said receiving member said rings being spaced apart, an air-box located above said receiving member and in communication with the atmosphere, air-pipes extending downwardly therefrom into the spaces between said rings and adjustable means for normally maintaining the top of said receiving member beneath the water level.

8. A system of the class described, comprising, in combination, a receiving channel, a water receiving member located therein for receiving and conveying water to a receptacle at a lower level, a plurality of concentric rings located at a common level in the upper part of said receiving member, said rings being spaced apart, and means in communication with the atmosphere and with the spaces between said rings for introducing air thereto, the contour of said rings and the area of the spaces between them being such as to cause proper fluid velocities for entraining air with the water admitted to said spaces.

9. A system of the class described, comprising, in combination, a receiving channel, a water intake member located therein having a plurality of openings for permitting a downward flow of water in separate streams, a discharge pipe connected with the bottom of said receiving channel leading to a receptacle at a lower level, a discharge tube in communication with the bottom of said intake member and arranged to telescope with said discharge pipe, air conduits in communication with the atmosphere and with the openings in said intake member and means for adjusting the relative height of said intake member with respect to the water level in said receiving channel.

10. A system of the class described, comprising, in combination, a receiving channel, a sedimentation tank below the level of said receiving channel, a discharge pipe leading from the bottom of said receiving channel to said tank, a water-intake member located in said receiving channel, said member having a vertical discharge pipe in telescopic relation to said discharge pipe leading from said receiving channel, an orifice-plate in said intake-member for directing water therein in separate streams, air-intake conduits leading from the atmosphere to the openings in said orifice plate, means for maintaining a predetermined relation between said air-conduits and said orifice-plate and means for adjustably suspending said water intake member to hold it in operative relation to the water-level in the receiving channel.

11. A water system of the class described, comprising, in combination, a receiving channel, an aspirator located in said channel for conveying raw water to a vortex-whirl, a vortex-whirl situated at a lower level in operative connection with said aspirator, upper and lower sludge reservoirs in operative connection with said vortex-whirl, a water receptacle and means for delivering water thereto from said vortex-whirl.

12. A water system of the class described, comprising, in combination, a receiving channel, an aspirator located therein for conveying raw-water to a vortex-whirl, a vortex-whirl situated at a predetermined lower level in operative connection with said aspirator, upper and lower sludge-reservoirs in operative connection with said vortex-whirl, a floating weir located in said upper sludge reservoir, means for discharging the overflow therefrom and a clear water receptacle in operative connection with said vortex-whirl.

13. A water system of the class described, comprising, in combination, a receiving channel, an aspirator located therein, means for conveying raw-water to a vortex-whirl, a vortex whirl situated at a lower level than that of said aspirator, said vortex-whirl consisting of a vessel circular in cross-section, the upper and lower ends of which are conoidal in shape, a sludge receptacle in communication with the lower end of said vessel and one at the upper end with an overflow waste discharge, a tangentially arranged inlet pipe for connecting the body of said vessel with said aspirator, a well and a tangentially arranged outlet pipe leading thereto from the body of said vessel.

14. A water system of the class described, comprising, in combination, a closed receiving channel, means for introducing raw-water thereto under pressure, an aspirator located in said channel, means for conveying water from said aspirator to a sedimentation tank, a sedimentation tank, a vortex-whirl interposed between said aspirator and said sedimentation tank and means for discharging sedimentary matter of varying specific gravities from said vortex-whirl at different levels.

15. A water system of the class described, comprising, in combination, a receiving channel, means for introducing raw-water thereto, an aspirator located in said channel, means for conveying water from the said aspirator to a centrifugal separating device situated at a lower level, a centrifugal separating device in operative connection with said aspirator, means for discharging sedimentary matter of varying specific gravities, a clear water reservoir and means interposed between said centrifugal separating device and said clear water reservoir for aerating said water.

In testimony whereof, I have signed this specification in the presence of two subscribing witnesses, this sixth day of June 1916.

HENRY A. ALLEN.

Witnesses:
DAVID H. FLETCHER,
ALVA JOHNSTON.